Patented Oct. 19, 1926.

1,603,334

UNITED STATES PATENT OFFICE.

HERBERT A. ENDRES, OF AKRON, OHIO, ASSIGNOR TO THE GOODYEAR TIRE & RUBBER COMPANY, OF AKRON, OHIO, A CORPORATION OF OHIO.

LINER FOR RUBBERIZED MATERIAL AND METHOD OF TREATING THE SAME.

No Drawing.    Application filed November 4, 1922. Serial No. 599,142.

My invention pertains to the manufacture of rubber and rubberized material, and it has particular relation to a means for treating the liners which are adapted to be so disposed between adjacent layers thereof as to prevent adhesion of the rubber to the liners.

Heretofore, it has been customary in the manufacture of rubberized material, particularly of the sheeting type, to cause the same to move into engagement with and be deposited upon a liner composed of fibrous material upon leaving the calendering rolls. The liner, with the rubber attached thereto, was then placed in layers or rolled into any desired compact form. Considerable difficulty has been experienced in this stage of the manufacture owing to the fact that certain rubber stocks, particularly tube stocks, have a strong tendency to adhere to the liners, frequently resulting in loss of both time and material in separating them.

By my invention I have obviated the aforementioned difficulty by impregnating the liners with sulphur or other similar material associated with a protective colloid prior to the deposition of the rubber thereon. The sulphur in the liners causes the rubber to bloom, or, in other words, a migration of a portion of the sulphur in the rubber to the surface is effected causing a dense bloom, which prevents the rubber from adhering to the liner.

In practicing my invention, I have found it desirable to introduce the sulphur to the liner by passing it through a suitable mixture and subsequently drying it. The composition of the mixture, for obtaining best results, consists of sulphur particles, glycerine and a protective colloid, such, for example as gelatine or glue. The sulphur particles may be mixed with a quantity of glycerine, and subsequently with a solution of glue and water by means of a mixing mill. The glycerine serves to wet the sulphur particles, which would be a difficult matter with the glue alone, and the glue serves as a protective colloid, and, at the same time, assists in keeping the sulphur on the liner after it has been dried.

After the liners have been passed through a quantity of the mixture in question and have been subsequently dried, with the mixture impregnated therein, the rubber stock is deposited thereon. The sulphur in the liner causes that portion of the stock which is in engagement therewith to bloom thus preventing adhesion of the liner and the rubber product.

While I have described in detail but a single form of my invention, it will be obvious to those skilled in the art that it may assume any one of the plurality of forms and that many minor modifications and changes may be made therein without departing from the spirit of my invention or from the scope of the appended claims.

What I claim is:

1. A member adapted to have rubber deposited thereon and impregnated with sulphur and glycerine.

2. A member adapted to have rubber deposited thereon and impregnated with sulphur and gelatine.

3. A member adapted to have rubber deposited thereon and impregnated with sulphur, glycerine and gelatine.

4. The method of treating liners for rubber stock which comprises treating them with a mixture of sulphur and glycerine.

5. The method of treating liners for rubber stock which comprises treating them with a mixture of sulphur, glycerine and gelatine.

6. The method of treating liners for rubber stock which comprises treating them with a mixture of sulphur, glycerine, gelatine and water.

7. The method of treating liners for rubber stock which comprises treating them with a mixture of sulphur and a protective colloid.

8. A liner treated with a composition embodying free sulphur and a material adapted to wet the sulphur.

In witness whereof, I have hereunto signed my name.

HERBERT A. ENDRES.